106. COMPOSITIONS, COATING OR PLASTIC
89
Patented Sept. 19, 1944

2,358,701

UNITED STATES PATENT OFFICE 2,358,701

HYDRAULIC COMPOSITION

Harry F. Gardner, Snyder, N. Y., assignor to Certain-teed Products Corporation, New York, N. Y., a corporation of Maryland No Drawing. Application March 6, 1941, Serial No. 382,015

6 Claims. (Cl. 106—89)

This invention relates to calcined gypsum plasters and more especially to such plasters which are used in connection with the manufacture of plate glass.

Plasters of the type to which the invention relates commonly are prepared from natural gypsum by calcining the raw material by well known processes to produce a product composed primarily of calcium sulphate represented by the formula CaSO₄;½H₂O. The invention, however, extends to other plasters, so called stuccos, derived from gypsum which are capable of setting with water and mixing therewith.

In the manufacture of plate glass calcined gypsum, for the most part in the form $$CaSO_4; \tfrac{1}{2}H_2O$$

is used as a bedding material upon which to bed the glass so as to support it and keep it in place and to prevent movement thereof during the grinding and polishing operations. For this purpose the material must have certain qualities which characterize it as "plate glass stucco." Preparatory to bedding the glass a slurry of the stucco is made by mixture with water in such amounts as will produce the required consistency, ordinarily a quite thin pouring consistency, in order to apply the slurry to the bed of the grinding or polishing machine. The slurry is spread upon this bed over sufficient area substantially as a film upon which the glass is placed. The film of slurry acts substantially as an adhesive placed between two surfaces, eliminating for the most part the film of air which otherwise might exist between the face of the sheet and the bed. When the slurry sets, the set stucco must have the quality of sticking to the glass and to the bed sufficiently to hold the glass in place during the successive grinding and polishing operations which are carried out one after the other. It also must fill up the inequalities in the surface of the bed as well as in the surface of the glass in order that complete or ample support over the whole extent of the glass sheet shall be provided. If the support is inadequate or not uniformly distributed extensive breakage of the glass may occur.

For the purpose of grinding and polishing glass to produce plate glass calcined gypsum is particularly advantageous because it sets rapidly relative to other hydraulic setting materials and its crystals are not of an abrasive character relative to glass. The stucco when set, moreover, is capable of taking the load and the pressure even when applied in a thin film. If it can be made to adhere to the glass it will hold the glass in place against the extremely great forces produced by the grinding and polishing heads of the machine.

In the use of ordinary calcined gysum stuccos for plate glass grinding and polishing operations, it has been the practice to incorporate in the slurry at the time of mixing it, a certain amount of hydrated lime. The purpose of adding this lime to the slurry is to secure or increase adhesion of the stucco to both the bed and to the glass. The addition of the lime also reduces the amount of the expansion which occurs on the setting of the slurry. It is thought that this property of reduction of the expansion as it reduces the relative movement of the glass and the stucco, may aid the capacity of the stucco to adhere to the glass. In view of the modern practice of grinding and polishing glass in large sheets, of the dimension of 12 feet or more in width, a great degree of expansion on setting of the stucco may be detrimental. In practice a high calcium hydrated lime has been preferred over the hydrated dolomitic lime.

While it has been the general practice in the past thus to add the lime to the stucco when the slurry is mixed in the glass plant for bedding the glass it also has been proposed heretofore, in order to expedite the operations and for convenience in handling, to incorporate the lime with the stucco at the manufacturing plant so that the stucco for plate glass bedding may be used just as it is delivered to the grinding and polishing operations. It thus only becomes necessary to mix water with the stucco and spread the slurry as above described.

It has been found, however, in stuccos carrying lime incorporated at the manufacturing plant that the setting time of the stucco varies to too great a degree after shipment. This variation probably occurs because of changes in the lime contained in the stucco, or its reaction, in the interval, with constituents of the atmosphere, e. g., carbon dioxide. In such combined lime and calcined gypsum stucco products, it has been proposed to incorporate substantial amounts of lime, in the range between 1% and 7%, in order to secure the desired properties in the slurry and in the set stucco resulting therefrom. These proportions proposed for these composite stuccos were adopted from the practice in the glass plants of incorporating 1% to 7% of lime in the slurry at the grinding and polishing operations. Such stuccos while having good adhesive capacity are subject to marked slowing of the setting upon aging so that if not used soon after manufacture they become worthless for this purpose. It then becomes necessary to use an accelerator with the stucco. This involves additional treatment at the glass plant which is objectionable.

To meet these conditions and to overcome difficulties of the prior art practice the invention provides a composite manufactured calcined gypsum stucco for plate glass bedding which avoids the objections above referred to while maintaining the necessary properties of such stuccos as to their water-carrying capacity, fineness of grind, setting time of the slurry and other qualities. According to the invention, the stucco comprises calcined gypsum in predominant amount as the hydraulic setting material. Admixed with the calcined gypsum are lime and Portland cement together with an accelerator. The proportions of the ingredients are determined within certain limits hereinafter disclosed in order properly to control the properties of the composite mixture, particularly with regard to the adhesion of the stucco to the glass surface and to the bed, the expansion of the stucco upon setting from the slurry and, as well, the important characteristic of maintaining a setting time which will not vary widely from that of the freshly manufactured stucco upon aging of the stucco.

As stated above, it has been the practice to add lime to the stucco to secure a requisite adhesion and other conditions for the bedding of the glass. The invention utilizes lime in the composite stucco for this same purpose. In order, however, to secure the requisite stability of set Portland cement is included in the stucco. It has been found that this addition of Portland cement to the stucco having also lime incorporated therewith does not interfere with the action of the lime. On the contrary, it is believed to assist to some extent the action of the lime as to its effect of securing adhesion and limiting the expansion. When incorporated in proper amount in relation to the amount of lime it is possible, according to the invention, to improve the adhesive properties of the stucco, limit the expansion thereof, as well as to improve the stability of the stucco upon aging. The incorporation of Portland cement in the stucco also acts against the tendency of the lime to cause an increase initially in the length of setting time as well as upon aging, in stuccos which carry lime alone.

To accomplish these results, according to the invention, it is important that the amounts of the lime and of the Portland cement be used substantially within the limits hereinafter disclosed. The amount of the lime should not be so large that excessive amounts of accelerator are necessary to obtain the quick set requisite for plate glass bedding. While lime mixed with an ordinary calcined gypsum stucco acts as an accelerator, ordinarily it does not produce setting times which are short enough for the purposes of plate glass bedding. Accelerators are, therefore, added which will produce rapid setting. Relative to such accelerators the lime acts as a retarder. As stuccos for plate glass bedding are ordinarily required to set within less than 10 minutes, active accelerators in most cases are incorporated in the stucco of the present invention, although in the case of some calcined gypsums the composite stucco may not require an accelerator. In order to avoid using large amounts of such accelerators which may be detrimental to other properties of the stucco, the amount of lime which is incorporated in the composite stucco of the invention is kept substantially within the limits hereafter prescribed. The amount of the Portland cement usually will be in excess of the amount of lime, that is, the amount of lime preferably will not exceed the amount of the Portland cement. The amount of the lime also must be limited in order that it shall not act to effect too great a slowing down of the set upon aging as when it is used alone according to prior practice.

The accelerator to be included in the composite stucco of the invention is chosen so as to be compatible with the other admixed ingredients of the composite stucco and so as not to interfere with the above described actions of the lime and Portland cement, as well as to maintain the necessary properties of the stucco for plate glass bedding. To this end also a suitable relation between or ratio of the amounts of the lime, which as explained has a retarding effect and the Portland cement and the accelerator have been determined. It has been found preferable to use in the composite stucco made according to the invention land plaster, that is, uncalcined or raw ground gypsum as the accelerator. Mixtures, however, of land plaster with certain other substances may be used, for example, a mixture of land plaster and potassium chloride or a mixture of land plaster and potassium sulphate. Other mixtures of land plaster and inorganic salts may be utilized for the purpose of securing the requisite short setting time.

The following tabulation indicates the proportions of the ingredients of the composite stucco of the invention. While some departure from the range of amounts given may be made, any substantial departure will adversely affect some of the properties of the stucco for the purpose.

| | Percent |
|---|---|
| Calcined gypsum | 81.0 to 98.9 |
| Lime | 0.1 to 8.0 |
| Portland cement | 1.0 to 8.0 |
| Accelerator | 0.01 to 3.0 |

The preferred range of said ingredients, however, may be as follows:

| | Percent |
|---|---|
| Calcined gypsum | 90.5 to 98.7 |
| Lime | 0.3 to 4.0 |
| Portland cement | 1.0 to 4.0 |
| Accelerator | 0.01 to 1.5 |

Within this preferred range it has been found that for the most part the desired control may be effected with ordinary gypsum stuccos available for treatment.

With a composite stucco made according to the invention having the following formula:

| | Per cent |
|---|---|
| Calcined gypsum | 95.25 |
| Lime | .50 |
| Portland cement | 3.00 |
| Land plaster | 1.25 | it has been found that the adhesion of the stucco to glass is substantially as strong as when lime alone is mixed with ordinary stucco at the glass plant for bedding purposes. Moreover, by test it has been found that the setting expansion of the stucco is .14% as determined by the comparator open trough method of the Bureau of Standards when using a stucco made into a slurry by mixing 100 grams of stucco with 120 grams of water. The mixing is continued to the first slight stiffening of the slurry and then the test is made. Comparable with this test a similar test made on a stucco without Portland cement but containing 5% lime and 1.25% land plaster gave a setting expansion of .11%. Similarly, for a stucco containing 5% Portland cement and 1% land plaster without lime the setting expansion was .17%. Similar tests wtih 3% instead of 5% of lime and with 3% of Portland cement instead of 5% respectively showed similar results as to setting expansion. It will be seen from the above comparison that, while the setting expansion for the composite stucco of the invention is somewhat greater than for a stucco containing lime alone as the auxiliary ingredient, it is substantially less than that for Portland cement alone as the auxiliary ingredient. When the proportions of the composite stucco are modified from those of the formula above given so as to increase the lime and decrease the Portland cement still lower setting expansion is obtained, for example, with a stucco containing 2.5% of lime and 2.5% of Portland cement with 1.25% of land plaster a setting expansion of .12% results. It will be seen that this setting expansion approaches closely to that obtained with lime alone and that this is accomplished without making the lime become predominant.

As an indication of improvement in the resistance to slowing down of the set on aging a stucco which contains 5% of lime and 1.5% of land plaster may have a set of 10 minutes when fresh. The set for this stucco, however, slows down to 32 minutes upon aging for three days in a paper bag. In contrast the composite stucco of the invention containing 3% of Portland cement and .5% of lime, together with 1.25% of land plaster as in the above formula has a setting time when fresh of 8½ minutes. The setting time after aging for 6 days in a paper bag was found to be 10 minutes and after aging for 5 weeks was 10½ minutes. As the time between manufacture and actual use in the glass plant is commonly 5 to 6 weeks, this maintenance of the setting time in the plaster of the invention is particularly significant. The slowing of the setting time in such a 5 week period for a stucco containing lime alone added at the manufacturing plant would be greatly increased so that the setting time might become 35 minutes or more. The setting time of the composite stucco of the invention, however, would remain of the degree of 10 minutes or less so that the stucco could be used for plate glass bedding at any time after shipment from the manufacturing plant.

If Portland cement without lime is used together with an accelerator, such as land plaster, in comparable amounts to the amounts indicated in the formulae above, a similar degree of resistance to slowing down of the set on aging may be obtained. The adhesion of the stucco to the glass, however, is not as good as with the combination of Portland cement and lime and this combination constitutes the preferred form of the invention. Moreover, as indicated above, the expansion of the stucco with Portland cement alone is greater. For some purposes, however, Portland cement and land plaster may be used in order to obtain the resistance to slowing down of the setting time where, in consideration of the purposes and use as well as the quality of the calcined gypsum available for the stucco, a satisfactory adhesion and setting expansion may be secured without lime.

The characteristics of the invention which are defined by the above indicated proportions and ranges of the ingredients of the composite stucco may be expressed also in the ratio of the amount of Portland cement to the amount of lime. This ratio may lie in the range between 1 part of Portland cement to 1 part of lime up to 10 parts of Portland cement to 1 part of lime. Preferably, the ratio would lie in the range between 6 to 1 and 2 to 1. By increasing the amount of lime relative to Portland cement until the ratio becomes 1 to 1 a certain reduction of the setting expansion will result and the capacity of the stucco to adhere to the glass will be maintained. Some slowing down of the setting time upon aging also may result but, within the range of ratios given, this departure from the preferred composition does not result in serious slowing down of the setting time upon aging.

Having thus described my invention, I claim:

1. A composite stucco comprising calcined gypsum in an amount not substantially less than 81% and capable of setting with water, Portland cement, lime, and land plaster, the amount of the Portland cement not being substantially less than the amount of the lime.

2. A composite stucco comprising calcined gypsum in an amount not substantially less than 81% and capable of setting with water, Portland cement in an amount not substantially greater than 8%, lime in an amount not substantially greater than 8%, and an accelerator comprising land plaster.

3. A composite stucco comprising calcined gypsum in an amount not substantially less than 81% and capable of setting with water, Portland cement in an amount not substantially greater than 8%, lime in an amount not substantially greater than 8%, and an accelerator comprising land plaster and an inorganic salt of an alkali metal.

4. A composite stucco comprising calcined gypsum hemihydrate in predominant amount, lime in an amount substantially between 0.1% and 8.0%, Portland cement in an amount substantially between 1.0% and 8.0%, and land plaster between 0.01% and 3.0%.

5. A composite stucco comprising calcined gypsum hemihydrate in predominant amount, lime in an amount substantially between 0.3% and 4.0%, Portland cement in an amount substantially between 1.0% and 4.0%, and land plaster between 0.01% and 1.5%.

6. A composite stucco comprising calcined gypsum hemihydrate, lime in an amount between .3% and 4.0%, Portland cement in an amount between 1.0% and 4.0%, and an accelerator consisting of land plaster and an inorganic salt selected from the group consisting of potassium sulphate and potassium chloride.

HARRY F. GARDNER.